(12) United States Patent
Natarajan et al.

(10) Patent No.: US 12,398,261 B2
(45) Date of Patent: Aug. 26, 2025

(54) WATER-BASED BINDER SOLUTIONS FOR USE IN ADDITIVE MANUFACTURING PROCESSES

(71) Applicant: General Electric Company, Schenectady, NY (US)

(72) Inventors: Arunkumar Natarajan, Mason, OH (US); William C. Alberts, Saratoga Springs, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 248 days.

(21) Appl. No.: 18/130,089

(22) Filed: Apr. 3, 2023

(65) Prior Publication Data

US 2023/0250272 A1   Aug. 10, 2023

Related U.S. Application Data

(62) Division of application No. 17/326,698, filed on May 21, 2021, now Pat. No. 11,643,542.

(Continued)

(51) Int. Cl.
  *C08L 39/06* (2006.01)
  *B22F 10/14* (2021.01)
  (Continued)

(52) U.S. Cl.
  CPC ............. *C08L 39/06* (2013.01); *B22F 10/14* (2021.01); *B29C 64/165* (2017.08); *B33Y 10/00* (2014.12);
  (Continued)

(58) Field of Classification Search
  None
  See application file for complete search history.

(56) References Cited

U.S. PATENT DOCUMENTS

| 7,402,330 B2 | 7/2008 | Pfeifer et al. |
| 9,856,390 B2 | 1/2018 | Bredt et al. |

(Continued)

FOREIGN PATENT DOCUMENTS

JP   2017222163 A   12/2017

OTHER PUBLICATIONS

Extended European Search Report for EP Application No. 21173304.3-1107 dated Oct. 13, 2021.

(Continued)

*Primary Examiner* — Samir Shah
(74) *Attorney, Agent, or Firm* — Dinsmore & Shohl LLP

(57) ABSTRACT

In various embodiments, a water-based binder solution for use in additive manufacturing, includes a thermoplastic binder. The thermoplastic binder includes a first polymer strand having a weight average molecular weight (Mw) of from greater than or equal to 5,000 g/mol to less than or equal to 15,000 g/mol, a second polymer strand having a weight average molecular weight of from greater than or equal to 10,000 g/mol to less than or equal to 50,000 g/mol, and a third polymer strand having a weight average molecular weight of from greater than or equal to 1,000 g/mol to less than or equal to 5,000 g/mol. The binder solution further comprises from greater than or equal to 0.1 wt % to less than or equal to 5 wt % of a non-aqueous solvent having a boiling point of greater than 100° C.

6 Claims, 5 Drawing Sheets

Related U.S. Application Data

(60) Provisional application No. 63/029,964, filed on May 26, 2020.

(51) Int. Cl.
    *B29C 64/165*     (2017.01)
    *B33Y 10/00*     (2015.01)
    *B33Y 70/00*     (2020.01)
    *B33Y 80/00*     (2015.01)
    *B29K 29/00*     (2006.01)

(52) U.S. Cl.
    CPC ............... *B33Y 70/00* (2014.12); *B33Y 80/00* (2014.12); *B29K 2029/04* (2013.01); *B29K 2039/06* (2013.01); *C08L 2205/03* (2013.01)

(56) References Cited

U.S. PATENT DOCUMENTS

| | | |
|---|---|---|
| 10,406,751 B2 | 9/2019 | Fulop et al. |
| 2016/0325495 A1 | 11/2016 | Kuhn et al. |
| 2016/0368806 A1 | 12/2016 | Yamaguchi et al. |
| 2018/0162047 A1 | 6/2018 | Gibson et al. |
| 2018/0326484 A1 | 11/2018 | Bonilla Gonzalez et al. |
| 2019/0054527 A1 | 2/2019 | Natarajan et al. |
| 2019/0210277 A1 | 7/2019 | Sachs et al. |
| 2019/0299520 A1 | 10/2019 | Wieber et al. |
| 2020/0001359 A1 | 1/2020 | Nilsson et al. |

OTHER PUBLICATIONS

Japanese Patent Office Action for Application No. 2021-084904 dated Aug. 30, 2022 (5 pages).

WATER-BASED BINDER SOLUTIONS FOR USE IN ADDITIVE MANUFACTURING PROCESSES

CROSS-REFERENCE TO RELATED APPLICATIONS

This application is a divisional of and claims priority to U.S. Non-Provisional patent application Ser. No. 17/326,698 filed May 21, 2021 and entitled "Water-Based Binder Solutions for Use in Additive Manufacturing Processes," which itself claims priority to U.S. Provisional Patent Application Ser. No. 63/029,964 filed May 26, 2020 and entitled "Water-Based Binder Solutions for Use in Additive Manufacturing Processes," the entirety of each is incorporated by reference herein.

FIELD

This disclosure relates to additive manufacturing and, more particularly, to binders for use in additive manufacturing processes.

BACKGROUND

Additive manufacturing, also known as 3D printing, is a process in which material is built up layer by layer to form a three-dimensional part. Binder jetting is an additive manufacturing technique based on the use of a binder to join particles of a powder to form a three-dimensional part. In particular, the binder is jetted from a print head onto successive layers of the powder in a build volume, where layers of the powder and the binder adhere to one another to form a green body part. In some applications, the green body part is suitable for end-use. In other applications, subsequent processing, such as removal of the binder and sintering of the powder, may be needed to transform the green body part into a finished, three-dimensional part.

Conventional binder solutions may require a relatively long time to wick into the layer of powder, which can increase the amount of time required before a subsequent layer of powder can be deposited within the build volume. A longer wick time decreases the throughput, and therefore the productivity, of the additive manufacturing apparatus. However, some binder solutions that have achieved improved wicking time also exhibit an evaporation rate that adversely impacts the surface roughness.

Accordingly, the need exists for alternative binder solutions that enable decreased wick time and increased throughput of the additive manufacturing apparatus.

SUMMARY

Various embodiments disclosed herein meet these needs by providing an aqueous binder solution comprising a thermoplastic binder comprising a first polymer strand and at least one of a second polymer strand and a third polymer strand. In various embodiments, the first polymer strand has a weight average molecular weight (Mw) of from greater than or equal to 5,000 g/mol to less than or equal to 15,000 g/mol, the second polymer strand has a weight average molecular weight of from greater than or equal to 10,000 g/mol to less than or equal to 50,000 g/mol, and the third polymer strand has a weight average molecular weight of from greater than or equal to 1,000 g/mol to less than or equal to 5,000 g/mol. The aqueous binder solution further comprises from greater than or equal to 0.1 wt % to less than or equal to 5 wt % of a non-aqueous solvent having a boiling point of greater than 100° C. The formulation rapidly wicks into the powder layer, while also balancing a shortened cure time as compared to conventional binder solutions with an evaporation rate that does not adversely impact surface roughness. Additional features and advantages will be described in greater detail below.

According to a first aspect disclosed herein, a method of additive manufacturing comprises depositing a layer of a powder on a working surface; selectively depositing a water-based binder solution comprising from greater than or equal to 0.1 wt % to less than or equal to 5 wt % of a non-aqueous solvent having a boiling point of greater than 100° C. and below 175° C. and a thermoplastic binder into the layer of powder in a pattern representative of a structure of a part, wherein: the thermoplastic binder comprises: a first polymer strand having a weight average molecular weight (Mw) of from greater than or equal to 5,000 g/mol to less than or equal to 15,000 g/mol; and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; the first polymer strand differs from each of the second polymer strand and the third polymer strand; the second polymer strand differs from the third polymer strand; and coupling the first polymer strand with the at least one of the second polymer strand and the third polymer strand to form a green body part.

According to a second aspect disclosed herein, a method comprises the method according to the first aspect, wherein the non-aqueous solvent is present in the water-based binder solution in an amount of from greater than or equal to 1 wt % to less than 4 wt %.

According to a third aspect disclosed herein, a method comprises the method according to the first or second aspects, wherein the non-aqueous solvent comprises 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof.

According to a fourth aspect disclosed herein, a method comprises the method according to any of the previous aspects, wherein the first polymer strand comprises polyvinyl pyrrolidone (PVP), polyvinyl alcohol (PVA), or combinations thereof.

According to a fifth aspect disclosed herein, a method comprises the method according to any of the previous aspects, wherein the first polymer strand is present in an amount of from greater than or equal to 5 wt % to less than or equal to 20 wt % based on a total weight of the water-based binder solution.

According to a sixth aspect disclosed herein, a method comprises the method according to any of the previous aspects, the thermoplastic binder comprises the second polymer strand in an amount of from greater than or equal to 0.5 wt % to less than or equal to 7 wt % based on a total weight of the water-based binder solution.

According to a seventh aspect disclosed herein, a method comprises the method according to any of the previous aspects, wherein the thermoplastic binder solution comprises the third polymer strand in an amount of from greater than or equal to 0.1 wt % to less than or equal to 5 wt %.

According to an eighth aspect disclosed herein, a method comprises the method according to any of the previous aspects, wherein the second polymer strand is selected from the group consisting of polyvinyl alcohol (PVA), polyacryl amide (PAAm), derivatives thereof and combinations thereof.

According to a ninth aspect disclosed herein, a method comprises the method according to any of the previous aspects, wherein the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

According to a tenth aspect disclosed herein, a method comprises the method according to any of the previous aspects, wherein the water-based binder solution further comprises from greater than or equal to 0.1 wt % to less than or equal to 2 wt % of a surfactant.

According to an eleventh aspect disclosed herein, a method comprises the method according to any of the previous aspects, wherein a total weight of polymers present in the water-based binder solution is from greater than or equal to 5 wt % to less than or equal to 20 wt % based on a total weight of the water-based binder solution.

According to a twelfth aspect disclosed herein, a method comprises the method according to any of the previous aspects, wherein the first polymer strand comprises polyvinyl pyrrolidone (PVP); the second polymer strand is selected from the group consisting of polyvinyl alcohol (PVA), polyacryl amide (PAAm), derivatives thereof and combinations thereof; and the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

According to a thirteenth aspect disclosed herein, a green body part comprises a plurality of layers, at least one layer formed from a powder bound by a water-based binder solution comprising a thermoplastic binder, wherein: the thermoplastic binder comprises a first polymer strand having a weight average molecular weight (Mw) of from greater than or equal to 5,000 g/mol to less than or equal to 15,000 g/mol and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; the first polymer strand differs from each of the second polymer strand and the third polymer strand; the second polymer strand differs from the third polymer strand; and the first polymer strand is non-covalently coupled to the at least one of the second polymer strand and the third polymer strand.

According to a fourteenth aspect disclosed herein, a green body part comprises the green body part according to the thirteenth aspect, wherein the first polymer strand comprises polyvinyl pyrrolidone (PVP), polyvinyl alcohol (PVA), or combinations thereof.

According to a fifteenth aspect disclosed herein, a green body part comprises the green body part according to the thirteenth or fourteenth aspects, wherein the second polymer strand is selected from the group consisting of polyvinyl alcohol (PVA), polyacryl amide (PAAm), derivatives thereof and combinations thereof.

According to a sixteenth aspect disclosed herein, a green body part comprises the green body part according to any of the thirteenth through fifteenth aspects, wherein the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

According to a seventeenth aspect disclosed herein, a green body part comprises the green body part according to any of the thirteenth through sixteenth aspects, wherein the green body part has a green strength of greater than or equal to 10 MPa on x- and y-printed orientations.

According to an eighteenth aspect disclosed herein, a water-based binder solution for use in additive manufacturing comprises a thermoplastic binder comprising a first polymer strand having a weight average molecular weight (Mw) of from greater than or equal to 5,000 g/mol to less than or equal to 15,000 g/mol and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; wherein the first polymer strand differs from each of the second polymer strand and the third polymer strand and the second polymer strand differs from the third polymer strand; and from greater than or equal to 0.1 wt % to less than or equal to 5 wt % of a non-aqueous solvent having a boiling point of greater than 100° C.; and water.

According to a nineteenth aspect disclosed herein, a water-based binder solution comprises the water-based binder solution according to the eighteenth aspect, further comprising from greater than or equal to 0.1 wt % to less than or equal to 2 wt % of a surfactant.

According to a twentieth aspect disclosed herein, a water-based binder solution comprises the water-based binder solution according to the eighteenth or nineteenth aspects, wherein: the first polymer strand comprises polyvinyl pyrrolidone (PVP); the second polymer strand is selected from the group consisting of polyvinyl alcohol (PVA), polyacryl amide (PAAm), derivatives thereof and combinations thereof; and the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

Additional features and advantages of the embodiments disclosed herein will be set forth in the detailed description, which follows, and in part will be readily apparent to those skilled in the art from that description or recognized by practicing the disclosed embodiments as described herein, including the detailed description that follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
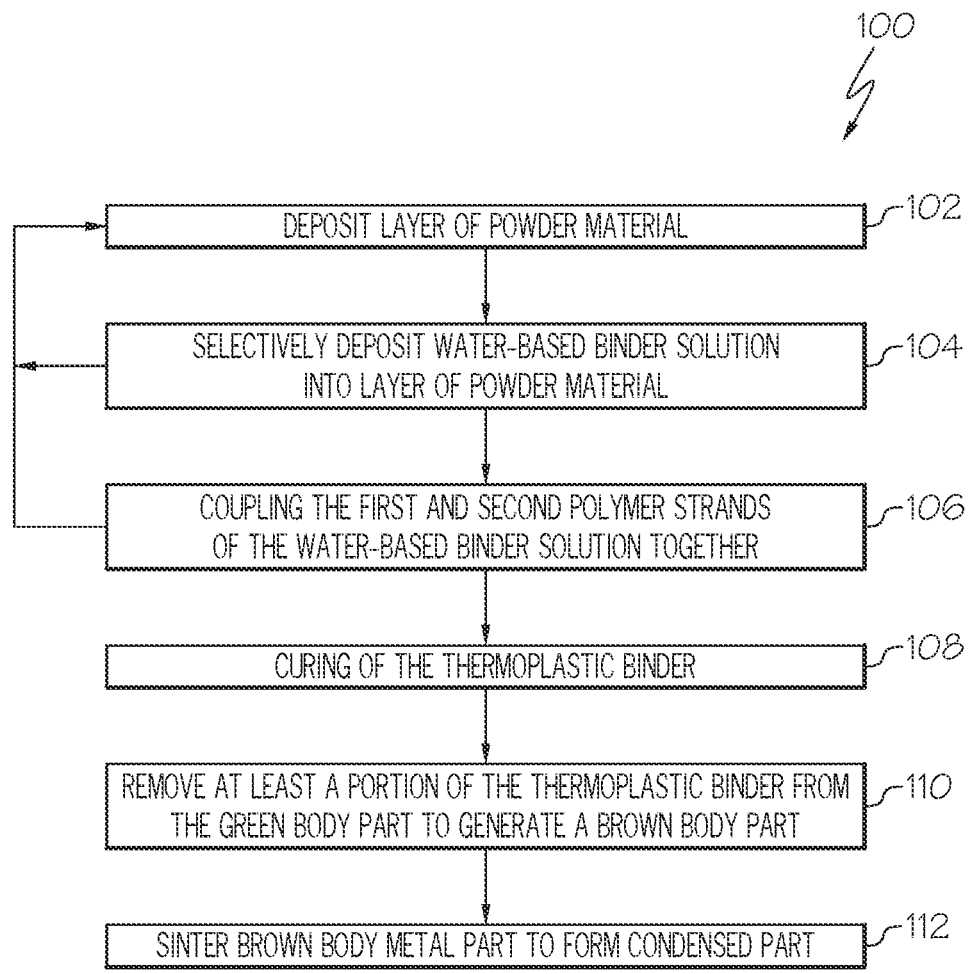
FIG. 1 is a flow diagram of an example method of manufacturing a part via additive manufacturing using a water-based binder solution including a thermoplastic binder according to one or more embodiments shown and described herein.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, "non-covalently couple" means that the first and second functional groups interact with one another via weak non-covalent forces, such as interactions or bonds, to link or otherwise couple strands of the thermoplastic polymer. As used herein, the phrase "weak non-covalent forces" is intended to denote hydrogen bonding, ionic bonding, Van der Waals forces, and the like.

As used herein, the phrases "green body metal part" and "green body part" denote a part that has not undergone heat treatment to remove the chemical binder. As used herein, the phrases "brown body metal part" and "brown body part" denote a part that has undergone heat treatment to remove the chemical binder. As used herein, a "metal part" means a part having metallic materials. While various embodiments are described in the context of metal parts, the binder solutions described herein are applicable to a wide variety of parts, including but not limited to, polymer and ceramic parts.

As used herein, the phrase "water-based" includes mixtures, solutions, suspensions, dispersions and the like that include water as a primary liquid by volume, but may include one or more other liquids. Accordingly, the solvent used for various binder solutions is mostly water. In some embodiments, the water is present at a concentration of at least about 50% of the binder solution by volume and in particular embodiments, the water is present at a concentration of at least about 75% by volume. As used herein, the term "water" includes deionized water, distilled water, and tap water, unless otherwise specified. In embodiments, water is ASTM D1193 type IV water or better.

In many binder jetting additive manufacturing processes, a chemical binder (e.g., a polymeric adhesive) is used to bond layers of powder to one another to form a three-dimensional object. The chemical binder may be, for example, a polymeric adhesive that is selectively deposited onto a powder bed in a pattern representative of a layer of the part being manufactured.

Accordingly, various embodiments described herein provide aqueous binder solutions that include a thermoplastic binder and a non-aqueous solvent having a boiling point of greater than 100° C. The thermoplastic binder includes a first polymer strand having a weight average molecular weight (Mw) of from greater than or equal to 5,000 g/mol to less than or equal to 15,000 g/mol and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol. Such embodiments can enable water-based binder solutions having reduced wicking time without adversely impacting the surface quality of the part. These and additional advantages will be described in greater detail below.

As set forth above, in various embodiments, the aqueous binder solution includes a thermoplastic binder and a non-aqueous solvent having a boiling point of greater than 100° C. The thermoplastic binder includes a first polymer strand having a weight average molecular weight (Mw) of from greater than or equal to 5,000 g/mol to less than or equal to 15,000 g/mol and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol. In embodiments, the combination of polymer strands having decreased weight average molecular weights with non-aqueous solvent(s) having decreased vapor pressures results in aqueous binder solutions that exhibit increased wicking rates for each layer, which may, in turn, enable higher through-put by the additive manufacturing machine as compared to conventional binder solutions. These and additional advantages will be described in greater detail below.

In various embodiments, the thermoplastic binder comprises a first polymer strand and at least one of a second polymer strand and a third polymer strand. As used herein, the term "polymer strand" includes a polymer backbone and a functional group grafted thereon. In embodiments, the thermoplastic binder is a thermoplastic binder that generally decomposes with very low char yields without requiring the presence of oxygen ($O_2$) (e.g., in vacuum, inert, or reducing atmospheres). Accordingly, in embodiments, the thermoplastic binder may be cleanly and readily removed from the part during sintering, generating a consolidated part that is substantially free of the thermoplastic binder and decomposition products that may be generated during heat treatment of a printed metal part, including, but not limited to, metal oxides and char.

The first polymer strand includes at least a first functional group. Functional groups of the first thermoplastic polymer strand can include, by way of example and not limitation, hydrogen bond donors, hydrogen bond acceptors, negatively charged groups, positively charged groups, or combinations thereof. For example, in various embodiments, the first functional group is incorporated into or grafted onto the backbone of the polymer strand (e.g., a vinyl backbone, amide backbone, acryl backbone, or the like) and is selected from hydroxyl groups, carboxylate groups, amine, thiol, amide, or other suitable functional groups that enable weak, non-covalent coupling (e.g., hydrogen bonding) of the first polymer strand and the second and/or third polymer strands.

In various embodiments, the first polymer strand includes polymers such as, but not limited to, polyvinylpyrrolidone (PVP), polyvinyl alcohol (PVA) derivatives thereof, and combinations thereof. In embodiments, the first polymer strand has a weight average molecular weight (Mw or weight average) of from greater than or equal to 5,000 g/mol to less than or equal to 15,000 g/mol. For example, the second polymer strand may have a weight average molecular weight (Mw) of from greater than or equal to 5,000 g/mol to less than or equal to 15,000 g/mol, from greater than or equal to 5,000 g/mol to less than or equal to 12,500 g/mol, from greater than or equal to 7,000 g/mol to less than or equal to 15,000 g/mol, from greater than or equal to 7,000 g/mol to less than or equal to 12,500 g/mol, from greater than or equal to 9,000 g/mol to less than or equal to 15,000 g/mol, or from greater than or equal to 9,000 g/mol to less than or equal to 12,500 g/mol, including any and all ranges and subranges in between.

The first polymer strand is included in the binder solution in an amount of from greater than or equal to 5 wt % to less than or equal to 20 wt %, from greater than or equal to 5 wt % to less than or equal to 18 wt %, from greater than or equal to 5 wt % to less than or equal to 16 wt %, from greater than or equal to 7 wt % to less than or equal to 20 wt %, from greater than or equal to 7 wt % to less than or equal to 18 wt %, from greater than or equal to 7 wt % to less than or equal to 16 wt %, from greater than or equal to 10 wt % to less than or equal to 20 wt %, from greater than or equal to 10 wt % to less than or equal to 18 wt %, or from greater than or equal to 10 wt % to less than or equal to 16 wt %, based on a total weight of the water-based binder solution, including any and all ranges and subranges in between.

In addition to the first polymer strand, the thermoplastic binder includes a second polymer strand, a third polymer strand, or second and third polymer strands. The second polymer strand includes at least a second functional group. Functional groups of the second thermoplastic polymer strand can include, by way of example and not limitation, hydrogen bond donors, hydrogen bond acceptors, negatively charged groups, positively charged groups, or combinations thereof. In embodiments, the second functional group of the second polymer strand complements a functional group of the first polymer strand of the thermoplastic binder to facilitate non-covalent coupling of the first and second polymer strands. For example, in various embodiments, the second functional group incorporated into or grafted onto the backbone of the polymer strand (e.g., a vinyl backbone, amide backbone, acryl backbone, or the like) and is selected from hydroxyl groups, carboxylate groups, amine, thiol, amide, or other suitable functional groups that enable weak, non-covalent coupling (e.g., hydrogen bonding) of the first and second polymer strands.

In various embodiments, the second polymer strand includes polymers such as, but not limited to, polyvinyl alcohol (PVA), polyamides, polyacryl amide (PAAm), polyvinyl methyl ether maleic anhydride (PVME-MA), derivatives thereof, and combinations thereof. In embodiments, the second polymer strand has a weight average molecular weight (Mw or weight average) of from greater than or equal to 10,000 g/mol to less than or equal to 50,000 g/mol. For example, the second polymer strand may have a weight average molecular weight (Mw) of from greater than or equal to 10,000 g/mol to less than or equal to 50,000 g/mol, from greater than or equal to 10,000 g/mol to less than or equal to 30,000 g/mol, from greater than or equal to 10,000 g/mol to less than or equal to 25,000 g/mol, from greater than or equal to 10,000 g/mol to less than or equal to 23,000 g/mol, from greater than or equal to 13,000 g/mol to less than or equal to 50,000 g/mol, from greater than or equal to 13,000 g/mol to less than or equal to 30,000 g/mol, from greater than or equal to 13,000 g/mol to less than or equal to 25,000 g/mol, from greater than or equal to 13,000 g/mol to less than or equal to 23,000 g/mol, from greater than or equal to 23,000 to less than or equal to 50,000 g/mol, from greater than or equal to 23,000 g/mol to less than or equal to 30,000 g/mol, from greater than or equal to 23,000 g/mol to less than or equal to 25,000 g/mol, from greater than or equal to 25,000 g/mol to less than or equal to 50,000 g/mol, from greater than or equal to 25,000 g/mol to less than or equal to 30,000 g/mol, or from greater than or equal to 30,000 g/mol to less than or equal to 50,000 g/mol, including any and all ranges and subranges in between.

When present, the second polymer strand is included in the binder solution in an amount of from greater than or equal to 0.5 wt % to less than or equal to 7 wt %, from greater than or equal to 1 wt % to less than or equal to 7 wt %, from greater than or equal to 1 wt % to less than or equal to 5 wt %, or from greater than or equal to 1 wt % to less than 4 wt %, based on a total weight of the water-based binder solution, including any and all ranges and subranges in between.

The third polymer strand includes at least a third functional group different from the first functional group of the first polymer strand and from the second functional group of the second polymer strand. Functional groups of the third thermoplastic polymer strand can include, by way of example and not limitation, hydrogen bond donors, hydrogen bond acceptors, negatively charged groups, positively charged groups, or combinations thereof. In embodiments, the second and third functional groups of the second and third polymer strands, respectively, complement the first functional group of the first polymer strand of the thermoplastic binder to facilitate non-covalent coupling of the first, second and third polymer strands. For example, in various embodiments, the third functional group may be selected from hydroxyl groups, carboxylate groups, amine, thiol, amide, or other suitable functional groups that enable weak, non-covalent coupling of the first and third polymer strands.

In various embodiments, the third polymer strand includes polymers such as, but not limited to, polyacrylic acid (PAA), poly methacrylic acid (PMAA), polyacrylamide (PAAm), derivatives thereof, and combinations thereof. In embodiments, the third polymer strand has a weight average molecular weight (Mw or weight average) of from greater than or equal to 1,000 g/mol to less than or equal to 5,000 g/mol. For example, the second polymer strand may have a weight average molecular weight (Mw) of from greater than or equal to 1,000 g/mol to less than or equal to 5,000 g/mol, from greater than or equal to 1,500 g/mol to less than or equal to 3,000 g/mol, or from greater than or equal to 1,500 g/mol to less than or equal to 2,000 g/mol, including any and all ranges and subranges in between.

In embodiments, the particular polymer selected as the third polymer strand can vary depending on the particular polymer selected as the first polymer strand and, when present, the second polymer strand. For example, the first polymer strand can be PVP, the second polymer strand can be PVA and the third polymer strand can be PAA. Other polymer combinations can be used, provided their functional groups are able to form non-covalent bonds with one another. For example, in embodiments, one of the functional groups is a hydrogen donor, while the other functional group is a hydrogen acceptor.

When present, the third polymer strand is present in the binder solution in an amount of from greater than or equal to 0.1 wt % to less than or equal to 5 wt %, from greater than or equal to 0.1 wt % to less than or equal to 3 wt %, from greater than or equal to 0.1 wt % to less than or equal to 2 wt %, from greater than or equal to 0.5 wt % to less than or equal to 5 wt %, from greater than or equal to 0.5 wt % to less than or equal to 3 wt %, from greater than or equal to 0.5 wt % to less than or equal to 2 wt %, from greater than or equal to 1 wt % to less than or equal to 5 wt %, from greater than or equal to 1 wt % to less than or equal to 3 wt %, or from greater than or equal to 1 wt % to less than or equal to 2 wt %, based on a total weight of the water-based binder solution, including any and all ranges and subranges in between.

As set forth above, in embodiments, one or both of the second and third polymer strands may be included in the binder solution. For example, the binder solution may include the first polymer strand and the second polymer strand, the first polymer strand and the third polymer strand, or the first polymer strand, the second polymer strand, and the third polymer strand. Additionally, it should be appreciated that in various embodiments, the first polymer strand differs from each of the second polymer strand and the third polymer strand, and the second polymer strand differs from the third polymer strand. The particular polymers selected as each polymer strand can vary depending on the particular polymer(s) selected as the other polymer strand(s). In embodiments, the binder solution includes PVP as the first polymer strand and PVA as the second polymer strand. In embodiments, the binder solution includes PVP as the first polymer strand and PAA as the third polymer strand. In embodiments, the binder solution includes PVP as the first polymer strand, PVA as the second polymer strand, and PAA as the third polymer strand. Other polymer strand combinations are possible and contemplated.

In embodiments, the polymers of the thermoplastic binder (e.g., the first polymer strand, the second polymer strand and/or the third polymer strand) are included at a total weight of from greater than or equal to 5 wt % to less than or equal to 20 wt % based on a total weight of the water-based binder solution. For example, a total weight of the polymers is from greater than or equal to 5 wt % to less than or equal to 20 wt %, from greater than or equal to 5 wt % to less than or equal to 19 wt %, from greater than or equal to 5 wt % to less than or equal to 18 wt %, from greater than or equal to 10 wt % to less than or equal to 20 wt %, from greater than or equal to 10 wt % to less than or equal to 19 wt %, from greater than or equal to 10 wt % to less than or equal to 18 wt %, from greater than or equal to 12 wt % to less than or equal to 20 wt %, from greater than or equal to 12 wt % to less than or equal to 19 wt %, or from greater than or equal to 12 wt % to less than or equal to 18 wt %, including any and all ranges and sub-ranges included therein.

The first polymer strand and the second and/or third polymer strands are included in the binder solution in amounts to enable a suitable degree of coupling between the first polymer strand and the second and/or third polymer strands to yield a green body part having a green body strength suitable for handling during post-printing processes. In addition, the polymer strands are present in amounts such that the binder solution has a viscosity of from about 1 centipoise (cP) to about 40 cP using a rheometer. In embodiments, the binder solution has a viscosity of from 2 cP to 40 cP, from 2 cP to 35 cP, from 2 cP to 30 cP, from 2 cP to 25 cP, from 2 cP to 20 cP, from 2 cP to 15 cP, from 2 cP to 12 cP, from 4 cP to 40 cP, from 4 cP to 35 cP, from 4 cP to 30 cP, from 4 cP to 25 cP, from 4 cP to 20 cP, from 4 cP to 15 cP, from 4 cP to 12 cP, from 6 cP to 40 cP, from 6 cP to 35 cP, from 6 cP to 30 cP, from 6 cP to 25 cP, from 6 cP to 20 cP, from 6 cP to 15 cP, from 6 cP to 12 cP, from 8 cP to 40 cP, from 8 cP to 35 cP, from 8 cP to 30 cP, from 8 cP to 25 cP, from 8 cP to 20 cP, from 8 cP to 15 cP, from 8 cP to 12 cP, including any and all ranges and subranges in between.

In embodiments, the first polymer strand is present in an amount of from greater than or equal to 5 wt % to less than or equal to 20 wt % and the second polymer strand is present in an amount of from greater than or equal to 0.5 wt % to less than or equal to 7 wt %. In embodiments, the first polymer strand is present in an amount of from greater than or equal to 10 wt % to less than or equal to 16 wt % and the second polymer strand is present in an amount of from greater than or equal to 1 wt % to less than 4 wt %.

In embodiments, the first polymer strand is present in an amount of from greater than or equal to 5 wt % to less than or equal to 20 wt % and the third polymer strand is present in an amount of from greater than or equal to 0.1 wt % to less than or equal to 5 wt %. In embodiments, the first polymer strand is present in an amount of from greater than or equal to 10 wt % to less than or equal to 16 wt % and the third polymer strand is present in an amount of from greater than or equal to 0.5 wt % to less than or equal to 2 wt %.

In embodiments, the first polymer strand is present in an amount of from greater than or equal to 5 wt % to less than or equal to 20 wt %, the second polymer strand is present in an amount of from greater than or equal to 0.5 wt % to less than or equal to 7 wt %, and the third polymer strand is present in an amount of from greater than or equal to 0.1 wt % to less than or equal to 5 wt %. In embodiments, the first polymer strand is present in an amount of from greater than or equal to 10 wt % to less than or equal to 16 wt %, the second polymer strand is present in an amount of from greater than or equal to 1 wt % to less than 4 wt %, and the third polymer strand is present in an amount of from greater than or equal to 0.5 wt % to less than or equal to 2 wt %.

In addition to the thermoplastic binder, the binder solution includes a binder medium. The binder medium can include, for example, water, one or more non-aqueous solvents, and combinations thereof. In embodiments, the water-based binder solution includes a non-aqueous solvent having a boiling point of greater than 100° C. and less than or equal to 175° C. at 1 atm. The non-aqueous solvent is generally non-reactive (e.g., inert) such that it does not react with the powder material, the thermoplastic binder, or other additives that may be included in the water-based binder solution. In embodiments, in addition to being a solvent for the polymer strands, the non-aqueous solvent can act as a humectant, slowing evaporation of the water in the binder medium, which may in turn maintain reliability of the deposition and reduce the risk of flash curing during printing. The non-aqueous solvent can be, by way of example and not limitation, 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof. The particular non-aqueous solvent can be selected based at least in part on the polymer strands of the thermoplastic binder and any other additives that may be included in the water-based binder solution.

In various embodiments, the non-aqueous solvent has a boiling point of greater than 100° C. and less than or equal to 175° C., greater than or equal to 125° C. and less than or equal to 175° C., greater than or equal to 150° C. and less than or equal to 175° C., or greater than or equal to 165° C. and less than or equal to 175° C., including any and all ranges and subranges in between.

Without being bound by theory, it is believed that limiting the use of non-aqueous solvents that have a boiling point of greater than 100° C. can increase the vapor pressure of the water-based binder solution and decrease the cure energy requirement while maintaining the viscosity and wicking properties of the water-based binder solution. However, solvents that have a boiling point of greater than 175° C. were found to generally increase post-curing time by up to 50%. Accordingly, in various embodiments, the non-aqueous solvent is included in the water-based binder solution in an amount of from 0.1 wt % to less than or equal to 5 wt % based on a total weight of the water-based binder solution. For example, the non-aqueous solvent may be included in the water-based binder solution in an amount of from 0.1 wt % to 4 wt %, from 0.1 wt % to 3.9 wt %, from 1 wt % to 3 wt %, from 1 wt % to 3.9 wt %, or from 2 wt % to 3.9 wt %, including any and all ranges and subranges in between. Moreover, in embodiments, the water-based binder solution is free of solvents having a boiling point of greater than 200° C., greater than 195° C., greater than 190° C., greater than 185° C., greater than 180° C., or greater than 175° C. at 1 atm.

In embodiments, the water-based binder solution may optionally include one or more additives, such as additives that may facilitate deposition of the thermoplastic binder into the powder material, improve the wettability of the powder material, modify the surface tension of the water-based binder solution, or the like. Optional additives include surfactants, diluents, viscosity modifiers, dispersants, stabilizers, dyes or other colorants, or other additives known and used in the art. In some embodiments, the water-based binder solution includes at least one surfactant.

In embodiments, surfactants improve wetting speed and mediate interaction between the thermoplastic binder and the powder. Surfactants suitable for use in the water-based binder solution include ionic (e.g., zwitterionic, cationic, or anionic) or non-ionic depending on the properties of the thermoplastic binder and/or powder material. In various embodiments, the surfactant can be 2-[4-(2,4,4-trimethylpentan-2-yl) phenoxy]ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), alkylene oxide copolymer (e.g., HYPERMER™ KD2 available from Croda Advanced Materials), sodium dodecyl sulfate (SDS), hexadecyltrimethylammonium bromide (CTAB), dodecyltrimethylammonium bromide (DTAB), polypropoxy quaternary ammonium chloride (e.g., VARIQUAT™ CC 42 NS available from Evonik Industries), and combinations thereof.

Without being bound by theory, it is believed that the inclusion of surfactant in the binder solution may reduce surface tension of the binder solution, thereby improving wettability of the powder material by the binder solution. Accordingly, in embodiments, surfactant is included in the binder solution in an amount of from greater than or equal to 0.1 wt % to less than or equal to 2 wt %, from greater than or equal to 0.1 wt % to less than or equal to 1 wt %, from greater than or equal to 0.25 wt % to less than or equal to 2 wt %, or from greater than or equal to 0.25 wt % to less than or equal to 1 wt %, based on a total weight of the binder solution, including any and all ranges and sub-ranges included therein.

In various embodiments, the binder medium includes water, which, in various embodiments, comprises the balance of the solution. In various embodiments, water is present in an amount of greater than or equal to 75 wt %, greater than or equal to 80 wt %, or greater than or equal to 85 wt %, based on a total weight of the binder solution.

Figure 2:
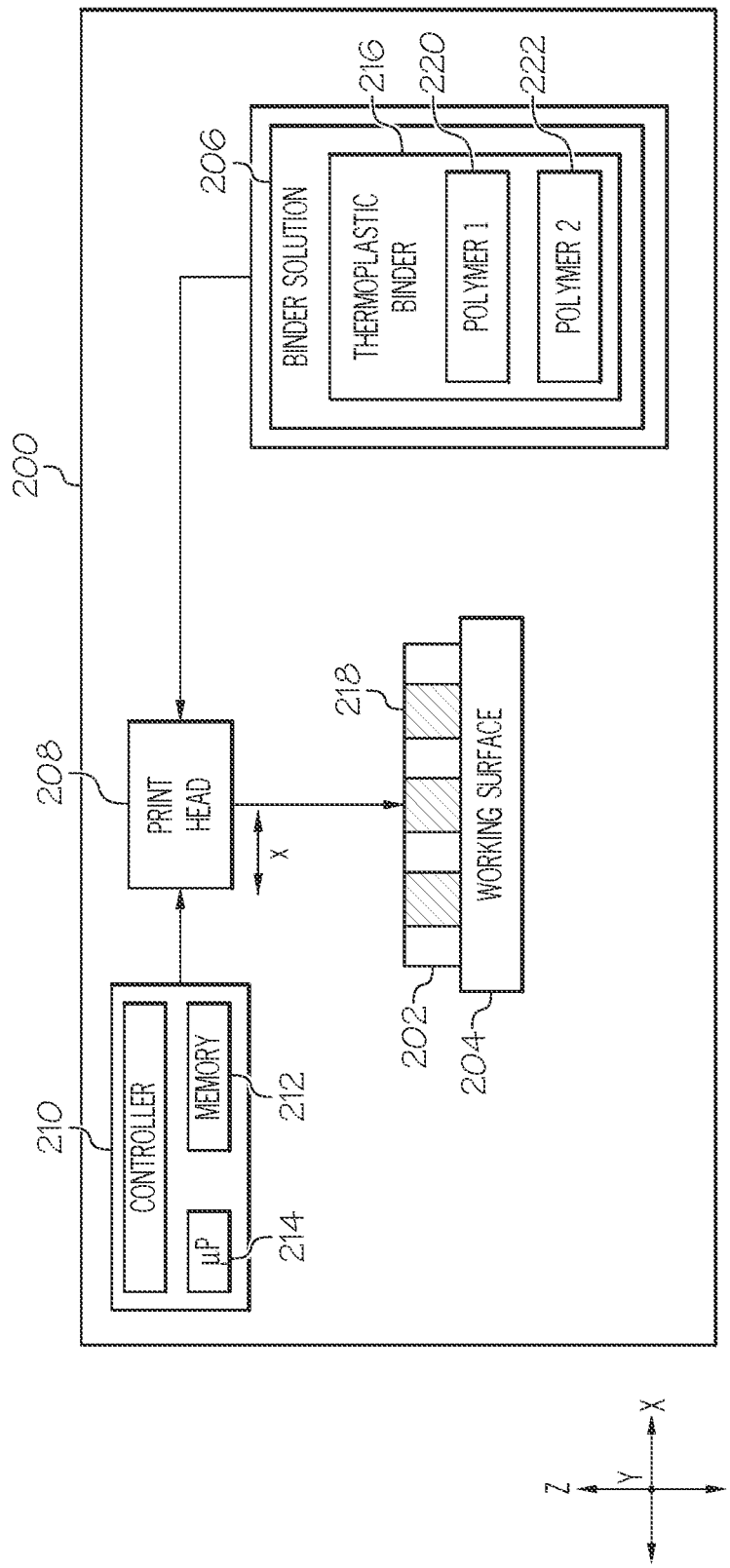
FIG. 2 is a block diagram of an embodiment of an additive manufacturing apparatus used to manufacture the part in accordance with the method of FIG. 1.

Moreover, in various embodiments, a green body part formed using the water-based binder solutions described herein exhibit a green body strength of greater than or equal to 10 MPa on each of the x- and y-printed orientations. As used herein, the "x-orientation" refers to a part having a largest dimension (e.g., length) along the x-axis, and the "y-orientation" refers to a part having a largest dimension (e.g., length) along the y-axis. As used herein, unless otherwise specified, the "x-axis" is the direction in which the print head moves with respect to the build plate on which the green body part is manufactured, as shown in FIG. 2. As used herein, the "y-axis" is a direction perpendicular to the x-axis (shown in FIG. 2), such that each layer of the green body part lies within an x-y plane. The "z-axis" is an axis normal to the x-y plane, where layers are stacked on one another along the z-axis, as shown in FIG. 2. For example, the green body part may exhibit a green body strength of from greater than or equal to 10 MPa to less than or equal to 25 MPa, from greater than or equal to 10 MPa to less than or equal to 20 MPa, from greater than or equal to 12 MPa to less than or equal to 25 MPa, or from greater than or equal to 12 MPa to less than or equal to 20 MPa, as measured in accordance with a 3-point bend test.

FIG. 1 is a block diagram depicting an embodiment of a method 100 for manufacturing an article via additive manufacturing using the water-based binder solutions described herein. To facilitate discussion of aspects of the method 100, reference is made to FIG. 2, which is a block diagram depicting an embodiment of an additive manufacturing apparatus 200 that can be used to perform method 100.

As depicted in FIG. 1, the method 100 begins with depositing a layer of a powder material 202 that is used to manufacture a part (block 102). In various embodiments, the layer of the powder material 202 is deposited on a working surface 204 of the additive manufacturing apparatus. The powder material can be a metal powder, such as a nickel alloy, cobalt alloy, cobalt-chromium alloy, cast alloy, titanium alloy, aluminum-based materials, tungsten, stainless steel, or the like. Other powder materials may be used depending on the particular embodiment.

Next, the method 100 continues with selectively depositing a water-based binder solution 206 into the layer of powder material 202 in a pattern representative of a structure of the part (block 104). The binder solution 206 can be, for example, any one of various embodiments of the binder solution described herein. In various embodiments, the binder solution 206 is selectively printed using a print head

208 that is operated by a controller 210 based on a CAD design that includes a representation of the layer of the part being printed.

In various embodiments, the controller 210 for controlling the print head 208 may include a distributed control system or any suitable device employing a general purpose computer or application-specific device. The controller 210 generally includes memory 212 storing one or more instructions for controlling operation of the print head 208. In embodiments, the memory 212 stores CAD designs representative of a structure of the part being manufactured. In embodiments, the CAD designs can include distortion compensation and, as such, the CAD design may not exactly match the geometry of the final desired part. Additionally, the controller 210 includes at least one processor 214 (e.g., microprocessor), and the memory 212 may include one or more tangible, non-transitory, machine-readable media collectively storing instructions executable by the processor 214 to control actions described herein.

After the binder solution 206 is selectively deposited into the layer of powder material 202, the thermoplastic binder 216 in the binder solution 206 at least partially coats an outer surface of powder particles, thereby generating binder-coated particles 218. As will be described, the thermoplastic binder 216 bonds the binder-coated particles 218 according to the pattern of the binder solution 206 printed into the layer of powder material 202 to form a layer of the green body part.

The method 100 may repeat the steps of depositing a layer of powder material (block 102) and selectively depositing the binder solution 206 into the layer of powder material (block 104) to continue building up the part in a layer-by-layer manner until a desired number of layers have been printed. The thermoplastic binder 216 of the binder solution 206 bonds each successive layer and provides a certain degree of strength (e.g., green body strength) to the green body part such that the integrity of the structure of the green body part is maintained during post-printing processes (e.g., transferring, inspecting, and/or depowdering). That is, the green body strength provided by the thermoplastic binder 216 of the binder solution 206 maintains bonding between the particles of the powder material 202 within the layers and blocks (e.g., resists and/or prevents) delamination of the layers during handling and post-printing processing of the green body part.

In various embodiments, the method 100 continues with curing of the thermoplastic binder (block 106). For example, as discussed hereinabove, the binder solution 206 is a mixture of a thermoplastic binder 216 and at least one solvent. In various embodiments, the first and second polymer strands 220, 222 of the thermoplastic binder 216 are coupled together via interaction between the first and second functional groups of the first and second polymer strands, respectively. Although the embodiment depicted in FIG. 1 references the first and second polymer strands 220 and 222, other polymer strands (e.g., third polymer strands) may also interact with the other polymer strands in the thermoplastic binder 216 when present.

While a portion of the solvent in the binder solution 206 may be evaporated during deposition (e.g., printing) of the binder solution 206, a certain amount of the solvent may remain within the layer of the powder material 202. Therefore, in embodiments, the binder solution 206 may be thermally cured at a temperature that is suitable for evaporating the solvent and allowing efficient bonding of the printed layers, thereby forming the green body part. Heat may be applied to the green body part using an IR lamp and/or heated plate, or may be carried out by placing the green body part in an oven.

Unbound particles from the powder layer (e.g., the powder material that is not bonded by the binder solution 206) may be removed before or after the curing step of block 106 to prepare the green body part for post-processing steps such as debinding and sintering.

In the embodiment depicted in FIG. 1, the method 100 includes removing (e.g., debinding) a portion of the thermoplastic binder from the green body part to generate a brown body part (block 108). In various embodiments, the binders provide strength (e.g., green body strength) to the green body part and, as such, only a portion (i.e., less than all) of the thermoplastic binder is removed during debinding of the green body part to improve the handling strength of the resulting brown body part before sintering.

During the debinding at block 108, the green body part is heated to break down a portion of the polymer strands of the thermoplastic binder 216. For example, the green body part may be heated to a temperature that is about 600° C. or less, or about 450° C. or less. In embodiments, the green body part is heated to a temperature of from 250° C. to 450° C. The heating can be performed, for example, in an oxygen-free environment (e.g., in a vacuum, or inert atmosphere or combination of both), or in air for ceramic part sintering. In embodiments in which the debinding is performed in an inert atmosphere, argon, nitrogen, or another substantially inert gas may be used. In some embodiments, the debinding step may be combined with the sintering step to in order to make the final consolidated part.

According to various embodiments, the debinding step of block 108 is effective to remove greater than about 95% of the thermoplastic binder 216. For example, greater than or equal to 95%, greater than or equal to 96%, greater than or equal to 97%, greater than or equal to 98%, or greater than or equal to 99% of the total amount of thermoplastic binder is removed during debinding. In some embodiments, the portion of the thermoplastic binder 216 that remains in the brown body part is less than or equal to 5%, less than or equal to 4%, less than or equal to 3%, less than or equal to 2%, or less than or equal to 1% of the amount of thermoplastic binder that was present prior to the debinding step. In embodiments, the portion of the thermoplastic binder 216 that remains in the brown body part is from 0.05% to 2% or from 0.1% to 1% of the amount of thermoplastic binder that was present prior to the debinding step and is removed in the later stage of sintering process (e.g., beyond 600° C. and into the higher sintering temperatures as described in accordance with block 110 for stainless steel, nickel alloys, and the like).

Following debinding at block 108, the method 100 continues with sintering the brown body part to form the consolidated part (block 110). During sintering, the remaining portion of the thermoplastic binder (e.g., oligomers formed during debinding) is removed from the brown body part and the particles of metal powder are consolidated to form the consolidated part. Sintering imparts strength and integrity to the brown body part such that, after cooling, the consolidated part is suitable for use in machinery, for example.

In some embodiments, sintering may be performed according to a two-step process including a pre-sintering step in which the remaining portion of the thermoplastic binder is removed and a sintering step in which the metal powder particles are consolidated. In some embodiments, sintering may be performed as a single step. During sintering, the brown body part is heated to temperatures of greater than 500° C., greater than 800° C., or greater than 1000° C. In embodiments, heat may applied by placing the brown body part in a furnace, or by exposing the brown body part to a concentrated source of energy, such as a laser beam, an electron beam, or another suitable energy source, depending on the particular embodiment.

Although various embodiments described herein are described with reference to method 100, it should be understood that embodiments of the water-based binder solution described herein can be used with a variety of methods that are known and used by those skilled in the art. In particular, curing and sintering may be accomplished in a number of different ways, in a number of different steps, and in a number of different locations.

first polymer strand (polyvinyl pyrrolidone (PVP)). Sample 1 included PVP as the first polymer strand and PAA as the third polymer strand. Samples 2, 3, 4, 5, and 6 included PVP as the first polymer strand, PVA as the second polymer strand, and PAA as the third polymer strand. Comparative Sample C and Samples 3-6 additionally included a surfactant, Triton-X or KD-2. The formulations for each of Samples 1-6 and Comparative Samples A-C are provided in Table 1 below.

TABLE 1

|  | Comp. Sample A | Comp. Sample B | Comp. Sample C | Sample 1 | Sample 2 | Sample 3 | Sample 4 | Sample 5 | Sample 6 |
| --- | --- | --- | --- | --- | --- | --- | --- | --- | --- |
| PVP | 0.0 | 0.0 | 0.0 | 16.0 | 10.0 | 7.0 | 7.0 | 16.0 | 10.0 |
| PVA | 4.8 | 6.7 | 4.8 | 0.0 | 4.0 | 4.0 | 4.0 | 0.0 | 4.0 |
| PAA | 1.0 | 1.3 | 1.0 | 2.0 | 1.0 | 1.0 | 1.0 | 2.0 | 1.0 |
| Ethylene Glycol | 4.4 | 0.0 | 4.4 | 0.0 | 0.0 | 0.0 | 0.0 | 0.0 | 0.0 |
| Ethyleneglycol-butyl ether | 9.0 | 2.0 | 9.0 | 2.0 | 2.0 | 4.0 | 2.0 | 2.0 | 2.0 |
| Triton-X | 0.0 | 0.0 | 0.3 | 0.0 | 0.0 | 0.5 | 0.5 | 0.0 | 0.5 |
| KD-2 | 0.0 | 0.0 | 0.0 | 0.0 | 0.0 | 0.0 | 0.0 | 0.5 | 0.0 |
| Water | BAL. | BAL. | BAL. | BAL. | BAL. | BAL. | BAL. | BAL. | BAL. |
| Wicking Time (sec) | 6.2, 18.7* | 9 | 5 | 3.50 | 4.9, 9* | 4.8 | 3.5, 8.3* | 4.1 | 10* |
| Viscosity (cps) | 9 | 10 | 9 | 3.84 | 9.92 | 8.96 | 10.9 | 5.12 | 8.96 |
| Surface tension | 36 | 44.2 | 35 | 45.7 | 45.5 | 36.3 | 36.4 | 40.5 | 32.3 |
| Green Strength (lbf) | 83, 72.0 | 96 | 55, 42 | 25 | 78.3, 100* | 108.7 | 117 | 34 | 103.5, 106.5* |

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples.

Example 1

Six example water-based binder solutions (Samples 1-6) and three comparative water-based binder solutions (Comparative Samples A, B, and C) were prepared by mixing thermoplastic binder in the form of one or more polymer strands in water and at least one additional co-solvent. All of the formulations (Comparative Samples A-C and Samples 1-6) included water as the primary solvent and a non-aqueous solvent, ethylene glycol butyl ether, having a boiling point of 171° C. at 1 atm and a vapor pressure of 0.8 mmHg. Comparative Sample A also included a second non-aqueous solvent, ethylene glycol, having a boiling point of 197° C. at 1 atm and a vapor pressure of 0.06 mmHg.

Comparative Samples A-C included poly(vinyl alcohol) (PVA) as the second polymer strand, and poly(acrylic acid) (PAA) as the third polymer strand, but did not include the To evaluate the wicking rate, samples were prepared by depositing Praxair Truform 316-L00 or Sandvik 316L powder coarse powders and Sandvik 316L fine powder (indicated in Table 1 as an asterisk (*)) (Fe-17Cr-12Ni-3Mo) powder into a petri dish and repeatedly tapping down the petri dish including the powder from about 0.5-1 inch from the surface 332 times using an AutoTap tap density analyzer instrument. For each sample, three 20 µL droplets of the binder solution were dispensed onto the powder bed and observed using video or timed using a stopwatch. Wicking of the droplet was timed from the first contact of the binder solution until the sheen disappeared. The wicking time (in seconds) is reported in Table 1.

Viscosity of the binder solution was determined using Brookfield rheometer and surface tension was determined using Du Noüy ring method. Green body samples were prepared by filling circular shaped silicone molds (4 cm×0.45 cm) with the metal powder and adding the binder to make a wet block. Samples were cured in a conventional oven at 200° C. or 170° C. for 1 hr. After cooling, the sample blocks were ejected out of the molds and used for further study. Green body strength was measured using a 3-point Instron tester. The green body strength is reported in Table 1.

As shown in Table 1, Comparative Sample A exhibited a wicking time of 6.2 seconds, while Sample 1 exhibited a wicking time of 3.5 seconds. Without being bound by theory, it is believed that the main polymer present in the binder formulation of Comparative Sample A has a weight average molecular weight (Mw) of 18,000 g/mol, and presence of higher wt % of non-aqueous solvents (up to 12%) increases the overall viscosity and wicking times in metal powders. The lower molecular weight of the polymers in the binder formulation of Sample 1 improved the wicking rates into the powder bed.

Figure 3:
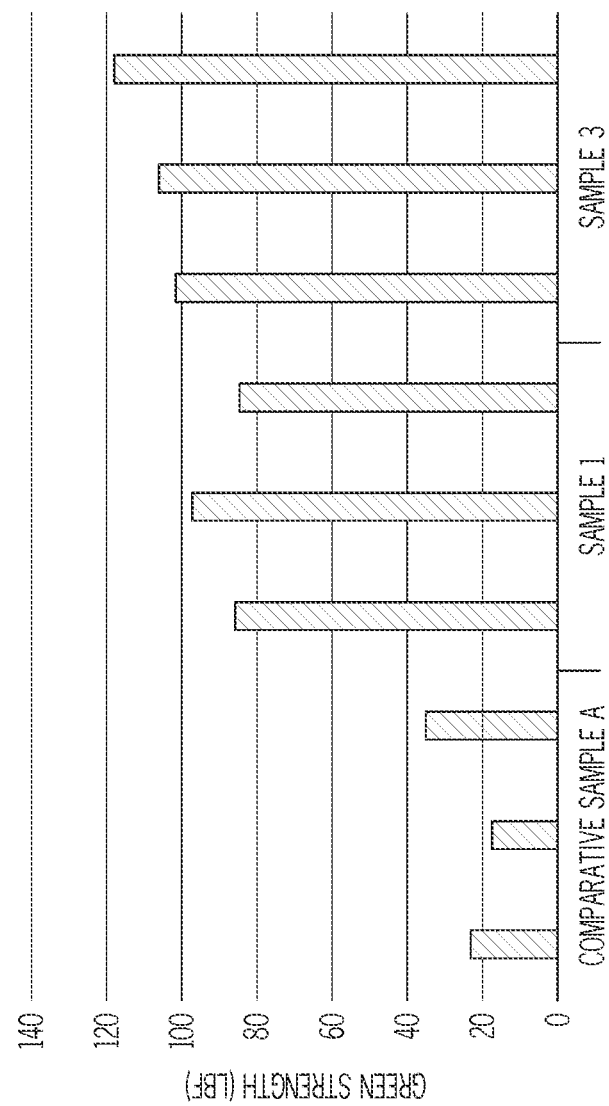
FIG. 3 is a graph showing the green body strength (in lbf; Y-axis) for samples prepared with the binder solutions of Comparative Sample A, Sample 1, and Sample 3.

In addition, it is believed that the lower molecular weight of the polymers in the binder formulation of Sample 1 also allowed the addition of more polymers overall (16 wt % in Sample 1 compared to approximately 5.0 wt % in Comparative Sample A), which yielded improved green body strengths, as shown in Table 1 for off-machine silicone mold samples. Additionally, some comparisons were made using green body part samples on machines of rectangular samples sized 15 mm×15 mm×105 mm printed by printing the binder solutions of Comparative Sample A, Sample 1, and Sample 3 on 316L Sandvik fine powder having a D50 of 12-15 µm are shown in FIG. 3. As shown in FIG. 3, the use of the three polymer system resulted in an increase in green body strength over the conventional binder solution.

Figure 4A:
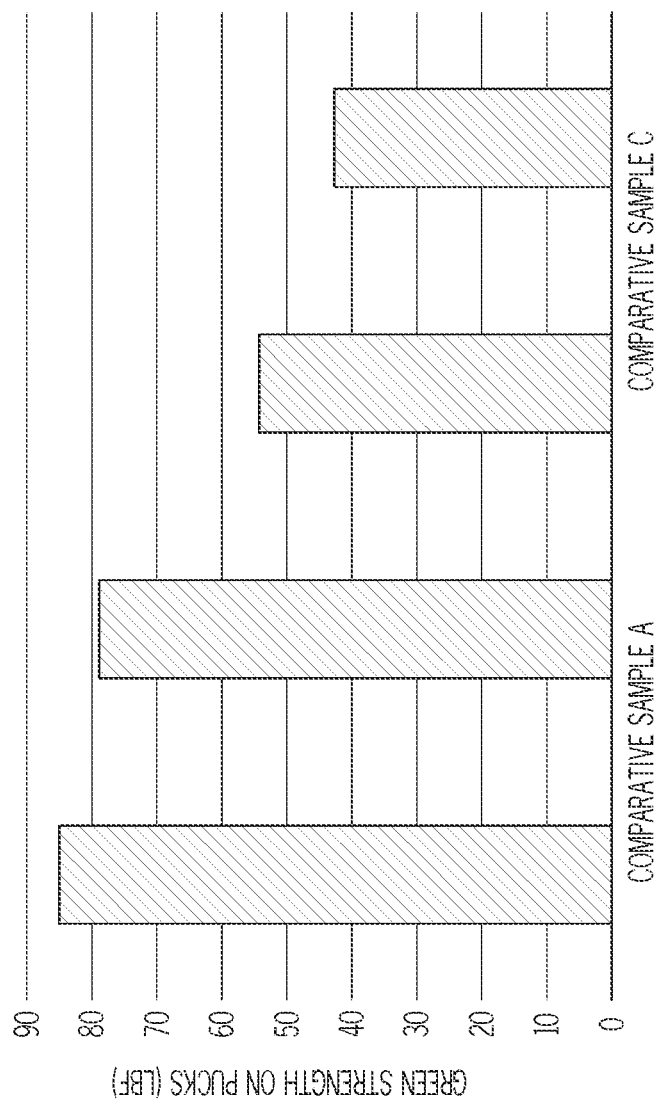
FIG. 4A is a graph showing the green body strength (in lbf; Y-axis) for samples prepared with the binder solutions of Comparative Samples A and C.
Figure 4B:
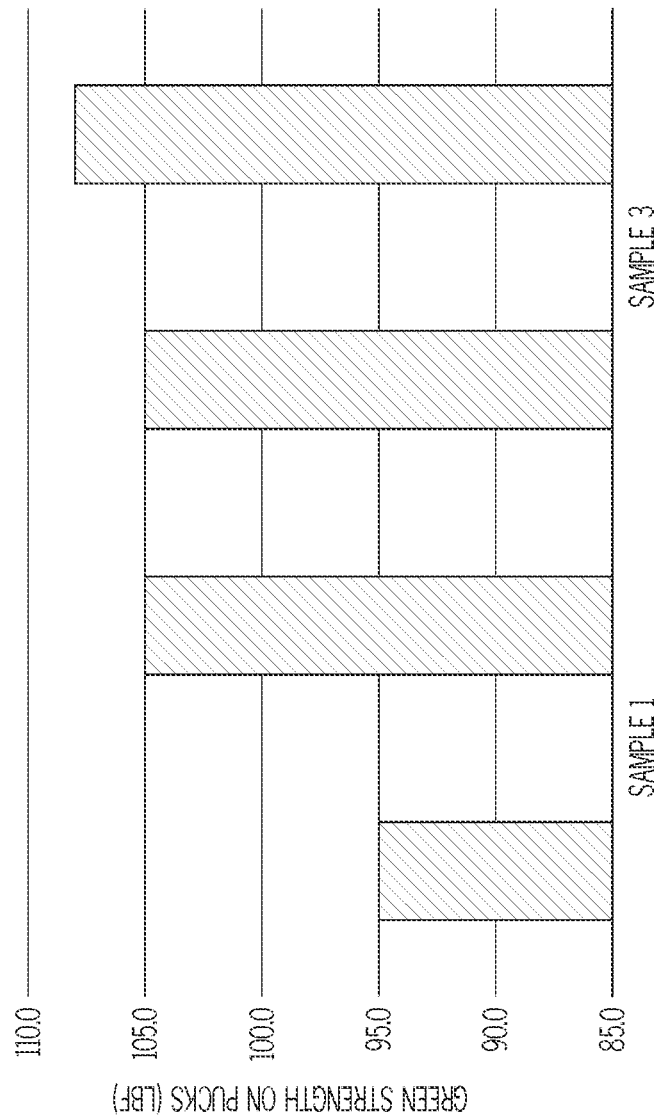
FIG. 4B is a graph showing the green body strength (in lbf; Y-axis) for samples prepared with the binder solutions of Samples 1 and 3.

Additional green body strength testing was conducted with Comparative Samples A and C and Samples 1 and 3 to explore the role of surfactant in the binder solutions. Green body parts were made using SS316L coarse powder having a D50 of 25 µm with Comparative Samples A and C using SS316L fine powder having a D50 of 12-15 µm with Samples 2 and 6. Green body parts were made according to the method described above. The results are shown in FIGS. 4A and 4B. As shown in FIGS. 4A, the addition of surfactant into Comparative Sample C resulted in a lower green body strength than the otherwise identical binder solution of Comparative Sample A. Without being bound by theory, it is believed that the surfactant impacts the hydrogen bonding between the polymers in the thermoplastic binder, thereby reducing the green body strength of the green body part, which largely stems from the interactions between the polymer strands to provide the strength. However, as shown in FIG. 4B, the addition of the surfactant in Sample 6 actually results in an improved green body strength as compared to the green body part printed with Sample 2, suggesting that higher polymer loading and multiple hydrogen bonding possibilities overpower the effects of the surfactant.

Further aspects of the invention are provided by the subject matter of the following clauses:

1. A method of additive manufacturing comprising: depositing a layer of a powder on a working surface; selectively depositing a water-based binder solution comprising from greater than or equal to 0.1 wt % to less than or equal to 5 wt % of a non-aqueous solvent having a boiling point of greater than 100° C. and below 175° C. and a thermoplastic binder into the layer of powder in a pattern representative of a structure of a part, wherein: the thermoplastic binder comprises: a first polymer strand having a weight average molecular weight (Mw) of from greater than or equal to 5,000 g/mol to less than or equal to 15,000 g/mol; and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; the first polymer strand differs from each of the second polymer strand and the third polymer strand; the second polymer strand differs from the third polymer strand; and coupling the first polymer strand with the at least one of the second polymer strand and the third polymer strand to form a green body part.

2. The method according to any preceding clause, wherein the non-aqueous solvent is present in the water-based binder solution in an amount of from greater than or equal to 1 wt % to less than 4 wt %.

3. The method according to any preceding clause, wherein the non-aqueous solvent comprises 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof.

4. The method according to any preceding clause, wherein the first polymer strand comprises polyvinyl pyrrolidone (PVP), polyvinyl alcohol (PVA), or combinations thereof.

5. The method according to any preceding clause, wherein the first polymer strand is present in an amount of from greater than or equal to 5 wt % to less than or equal to 20 wt % based on a total weight of the water-based binder solution.

6. The method according to any preceding clause, wherein the thermoplastic binder comprises the second polymer strand in an amount of from greater than or equal to 0.5 wt % to less than or equal to 7 wt % based on a total weight of the water-based binder solution.

7. The method according to any preceding clause, wherein the thermoplastic binder solution comprises the third polymer strand in an amount of from greater than or equal to 0.1 wt % to less than or equal to 5 wt %.

8. The method according to any preceding clause, wherein the second polymer strand is selected from the group consisting of polyvinyl alcohol (PVA), polyacryl amide (PAAm), derivatives thereof and combinations thereof.

9. The method according to any preceding clause, wherein the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

10. The method of any preceding clause, wherein the water-based binder solution further comprises from greater than or equal to 0.1 wt % to less than or equal to 2 wt % of a surfactant.

11. The method of any preceding clause, wherein a total weight of polymers present in the water-based binder solution is from greater than or equal to 5 wt % to less than or equal to 20 wt % based on a total weight of the water-based binder solution.

12. The method of any preceding clause, wherein the first polymer strand comprises polyvinyl pyrrolidone (PVP); the second polymer strand is selected from the group consisting of polyvinyl alcohol (PVA), polyacryl amide (PAAm), derivatives thereof and combinations thereof; and the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

13. A green body part comprising: a plurality of layers, at least one layer formed from a powder bound by a water-based binder solution comprising a thermoplastic binder, wherein: the thermoplastic binder comprises: a first polymer strand having a weight average molecular weight (Mw) of from greater than or equal to 5,000 g/mol to less than or equal to 15,000 g/mol; and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; the first polymer strand differs from each of the second polymer strand and the third polymer strand; the second polymer strand differs from the third polymer strand; and the first polymer strand is non-covalently coupled to the at least one of the second polymer strand and the third polymer strand.

14. The green body part according to any preceding clause, wherein the first polymer strand comprises polyvinyl pyrrolidone (PVP), polyvinyl alcohol (PVA), or combinations thereof.

15. The green body part according to any preceding clause, wherein the second polymer strand is selected from the group consisting of polyvinyl alcohol (PVA), polyacryl amide (PAAm), derivatives thereof and combinations thereof.

16. The green body part according to any preceding clause, wherein the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

17. The green body part according to any preceding clause, wherein the green body part has a green strength of greater than or equal to 10 MPa on x- and y-printed orientations.

18. A water-based binder solution for use in additive manufacturing, comprising: a thermoplastic binder comprising: a first polymer strand having a weight average molecular weight (Mw) of from greater than or equal to 5,000 g/mol to less than or equal to 15,000 g/mol; and at least one of a second polymer strand having a weight average molecular weight (Mw) of from greater than or equal to 10,000 g/mol to less than or equal to 50,000 g/mol and a third polymer strand having a weight average molecular weight (Mw) of from greater than or equal to 1,000 g/mol to less than or equal to 5,000 g/mol; wherein the first polymer strand differs from each of the second polymer strand and the third polymer strand and the second polymer strand differs from the third polymer strand; and from greater than or equal to 0.1 wt % to less than or equal to 5 wt % of a non-aqueous solvent having a boiling point of greater than 100° C.; and water.

19. The water-based binder solution according to any preceding clause, further comprising from greater than or equal to 0.1 wt % to less than or equal to 2 wt % of a surfactant.

20. The water-based binder solution according to any preceding clause, wherein: the first polymer strand comprises polyvinyl pyrrolidone (PVP); the second polymer strand is selected from the group consisting of polyvinyl alcohol (PVA), polyacryl amide (PAAm), derivatives thereof and combinations thereof; and the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

What is claimed is:

1. A green body part comprising: a plurality of layers, at least one layer formed from a powder bound by a water-based binder solution comprising from greater than or equal to 0.1 wt % to less than or equal to 5 wt % of a non-aqueous solvent having a boiling point of greater than 100° C. and below 175° C. and a thermoplastic binder, wherein:
   the thermoplastic binder comprises:
      a first polymer strand including a first functional group and having a weight average molecular weight (Mw) of from greater than or equal to 5,000 g/mol to less than or equal to 15,000 g/mol;
      a second polymer strand including a second functional group and having a weight average molecular weight (Mw) of from greater than or equal to 10,000 g/mol to less than or equal to 50,000 g/mol; and
      a third polymer strand including a third functional group and having a weight average molecular weight (Mw) of from greater than or equal to 1,000 g/mol to less than or equal to 5,000 g/mol;
   the first functional group differs from each of the second functional group and the third functional group;
   the second functional group differs from the third functional group; and
   the first polymer strand is non-covalently coupled to the at least one of the second polymer strand via the first and second functional groups and the third polymer strand via the first and third functional groups.

2. The green body part according to claim 1, wherein the first polymer strand is selected from the group consisting of polyvinyl pyrrolidone (PVP), polyvinyl alcohol (PVA), derivatives thereof, and combinations thereof.

3. The green body part according to claim 1, wherein the second polymer strand is selected from the group consisting of polyvinyl alcohol (PVA), polyacryl amide (PAAm), derivatives thereof, and combinations thereof.

4. The green body part according to claim 1, wherein the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

5. The green body part according to claim 1, wherein the first polymer strand is selected from the group consisting of polyvinyl pyrrolidone (PVP), polyvinyl alcohol (PVA), derivatives thereof, and combinations thereof, the second polymer strand is selected from the group consisting of polyvinyl alcohol (PVA), polyacryl amide (PAAm), derivatives thereof, and combinations thereof, and the third polymer strand is selected from the group consisting of polyacrylic acid (PAA), polymethyl methacrylate (PMMA), polyvinyl methyl ether-maleic anhydride (PVME-MA), derivatives thereof, and combinations thereof.

6. The green body part according to claim 1, wherein the green body part has a green strength of greater than or equal to 10 MPa on x- and y-printed orientations.

* * * * *